United States Patent
Ludewig et al.

(10) Patent No.: US 8,067,522 B2
(45) Date of Patent: Nov. 29, 2011

(54) LOW VISCOSITY, ALKOXYSILANE-FUNCTIONAL PREPOLYMERS AND A PROCESS FOR THEIR PREPARATION

(75) Inventors: Michael Ludewig, Köln (DE); Mathias Matner, Neuss (DE); Frank Kobelka, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 98 days.

(21) Appl. No.: 11/512,487

(22) Filed: Aug. 30, 2006

(65) Prior Publication Data
US 2007/0055035 A1  Mar. 8, 2007

(30) Foreign Application Priority Data
Sep. 3, 2005 (DE) .......... 10 2005 041 953

(51) Int. Cl.
C08G 18/00 (2006.01)
C08F 283/00 (2006.01)

(52) U.S. Cl. .............. 528/44; 525/474; 528/29

(58) Field of Classification Search .......... 528/29
See application file for complete search history.

(56) References Cited

U.S. PATENT DOCUMENTS

| | | | |
|---|---|---|---|
| 3,627,722 A | 12/1971 | Seiter | 260/37 N |
| 3,632,557 A | 1/1972 | Brode et al. | 260/77.5 TB |
| 4,067,844 A | 1/1978 | Barron et al. | 260/37 N |
| 4,345,053 A | 8/1982 | Rizk et al. | 525/440 |
| 4,857,623 A * | 8/1989 | Emmerling et al. | 528/28 |
| 5,319,053 A | 6/1994 | Slack et al. | 528/48 |
| 5,364,955 A | 11/1994 | Zwiener et al. | 556/418 |
| 5,691,441 A * | 11/1997 | Seneker et al. | 528/61 |
| 5,990,257 A | 11/1999 | Johnston et al. | 528/28 |
| 6,395,265 B1 * | 5/2002 | Mougin et al. | 424/70.12 |
| 6,545,087 B1 | 4/2003 | Schmalstieg et al. | 525/38 |
| 6,884,852 B1 | 4/2005 | Klauck et al. | 525/458 |
| 2004/0143084 A1 * | 7/2004 | Detig-Karlou et al. | 528/45 |
| 2005/0119436 A1 * | 6/2005 | Ziche et al. | 528/29 |

FOREIGN PATENT DOCUMENTS
EP 372 561 A2 6/1990
EP 676 403 B1 9/1999

OTHER PUBLICATIONS
Soucek et al. J. Polym. Sci. 2002, 40, 1677-1688.*

\* cited by examiner

*Primary Examiner* — Randy Gulakowski
*Assistant Examiner* — Robert Loewe
(74) *Attorney, Agent, or Firm* — Robert S. Klemz; Noland J. Cheung

(57) ABSTRACT

The present invention relates to a process for preparing alkoxysilane-functional prepolymers by reacting
  A) 1.0 equivalent of a polyol component have a number average molecular weight of 3000 g/mol to 20,000 g/mol and containing one or more polyoxyalkylene polyols or polyoxyalkylene polyol prepolymers with
  B) 1.05 to 1.50 equivalent of an isocyanate- and alkoxysilane-functional compound of formula I)

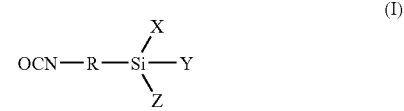

wherein
  X, Y, and Z independently of one another are linear or branched $C_1$-$C_8$ alkyl or $C_1$-$C_8$ alkoxy radicals, wherein at least one of the radicals is a $C_1$-$C_8$ alkoxy group and
  R is an organic radical having a functionality of at least two,
and subsequently further reacting the remaining free NCO groups by allophanatization or by reaction with
  C) an isocyanate-reactive component.
The present invention also relates to the alkoxysilane-functional prepolymers obtained by the process of the invention.

15 Claims, No Drawings

LOW VISCOSITY, ALKOXYSILANE-FUNCTIONAL PREPOLYMERS AND A PROCESS FOR THEIR PREPARATION

BACKGROUND OF THE INVENTION

1. Field of the Invention

The present invention relates to low viscosity, alkoxysilane-functional prepolymers, to a process for preparing them and to adhesives, sealants, primers or coatings prepared from these prepolymers.

2. Description of the Prior Art

Alkoxysilane-functional polyurethanes which crosslink via silane polycondensation are well established. A review article on this topic is found for example in "Adhesives Age" 4/1995, page 30 ff. (authors: Ta-Min Feng, B. A. Waldmann). Alkoxysilane-terminated, moisture-curing, one-component polyurethanes are increasingly being used as elastomeric coating, sealing and adhesive compositions in construction and in the automotive industry.

These alkoxysilane-functional polyurethanes can be prepared in accordance with U.S. Pat. No. 3,627,722 or U.S. Pat. No. 3,632,557 by reacting, for example, polyether polyols with an excess of polyisocyanate to form an NCO-containing prepolymer which is then further reacted with an amino-functional alkoxysilane. The resulting alkoxysilane-functional prepolymer contains a high concentration of urea groups and urethane groups, which results in products having high viscosities.

One effective way of reducing at least the portion of the hydrogen bond density resulting from the urea groups is to use secondary aminosilanes to generate substituted ureas. A variety of methods have been proposed for this purpose: U.S. Pat. No. 3,627,722 and U.S. Pat. No. 3,632,557 use alkyl-substituted aminosilanes; U.S. Pat. No. 4,067,844 uses an addition reaction of acrylates with the primary aminosilane; EP-A 596 360 uses an addition reaction of maleic esters with the primary aminosilane; and EP-A 676 403 introduces aryl-substituted aminosilanes. All of these methods, however, are able to replace only one hydrogen atom on the terminal urea group; all other urea protons and urethane protons continue to contribute, via hydrogen bonds, to a high viscosity.

Another appropriate way of reducing the density of the hydrogen bonds and, thus, the viscosity is disclosed in EP-A 372 561, in which very long chain polyether polyols are used with a low level of molecular weight increase through the reaction with the polyisocyanate. This requires polyethers which by virtue of specific preparation processes have a high functionality in conjunction with a low level of unsaturation and polydispersity. Further aspects of this technology are described in WO 99/48942 and WO 00/26271. However, this principle has a significant effect only in the case of very long chain prepolymers, designed for low-modulus binders, and even then it is only possible to eliminate some of the hydrogen bond density.

The possibility of obtaining prepolymers of particularly low viscosity by using isocyanate-functional alkoxysilane units is disclosed inter alia in U.S. Pat. No. 4,345,053. There an OH-functional prepolymer is terminated by an isocyanate-functional alkoxysilane, which theoretically saves one urea group per termination. However, the OH-functional prepolymer still contains urethane groups resulting from the reaction of a polyether polyol with diisocyanate. The amount of these urethane groups, as is also disclosed in EP-A 372 561, can be reduced by using specially prepared long-chain polyethers having a low level of unsaturation and polydispersity. In the case of a stoichiometric reaction of isocyanate-functional alkoxysilane units, binders are obtained which, due to inadequate capping, especially when using very long chain polyethers, are unable to crosslink sufficiently on curing. This leads to very soft polymers having a high surface tack and a deficient resilience, or a high plastic deformability.

It is an object of the present invention to provide modified alkoxysilane-functional prepolymers which do not have these disadvantages of the prior art, but have a comparable viscosity.

It has now been found that prepolymers having the required properties can be prepared by initially reacting long-chain polyethers or OH-functional polyether prepolymers with an excess of isocyanate functional alkoxysilane and removing the excess of isocyanate groups by subsequent allophanatization or reaction with a low molecular weight NCO-reactive compound.

SUMMARY OF THE INVENTION

The present invention relates to a process for preparing alkoxysilane-functional prepolymers by reacting
A) 1.0 equivalent of a polyol component having a number average molecular weight of 3000 g/mol to 20,000 g/mol and containing one or more polyoxyalkylene polyols or polyoxyalkylene polyol prepolymers with
B) 1.05 to 1.50 equivalent of an isocyanate- and alkoxysilane-functional compound of formula I)

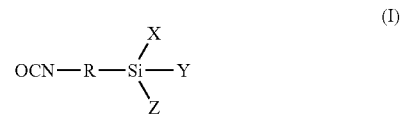

wherein
X, Y, and Z independently of one another are linear or branched $C_1$-$C_8$ alkyl or $C_1$-$C_8$ alkoxy radicals, wherein at least one of the radicals is a $C_1$-$C_8$ alkoxy group and
R is an organic radical having a functionality of at least two,
and subsequently further reacting the remaining free NCO groups by allophanatization or by reaction with
C) an isocyanate-reactive component.

The present invention also relates to the alkoxysilane-functional prepolymers obtained by the process of the invention.

DETAILED DESCRIPTION OF THE INVENTION

X, Y, and Z may independently of one another also be bridging. Preferably X, Y and Z in formula I) independently of one another are methoxy or ethoxy. R is preferably a linear, branched or cyclic alkylene radical having 1 to 8 carbon atoms, more preferably a methylene or propylene radical.

Preferably component A) has a number average molecular weight of 3000 g/mol to 20,000 g/mol, more preferably of 8000 g/mol to 18,000 g/mol. Polyoxyalkylene polyols useful as polyol component A) in accordance with the invention are the polyethers known from polyurethane chemistry and include the adducts or coadducts of tetrahydrofuran, styrene oxide, ethylene oxide, propylene oxide, butylene oxides or epichlorohydrin, particularly ethylene oxide and/or propylene oxide, that are prepared using dihydric to hexahydric starter molecules such as water or the polyols described below for use as component C) or amines having 1- to 4-NH bonds. Preferred are propylene oxide polyethers which have an average of 2 to 4 hydroxyl groups and can contain up to 50% by weight of incorporated polyethylene oxide units. The polyethers may be prepared by catalysis with potassium hydroxide, for example, and also polyethers prepared by the more recent processes based on double metal cyanide catalysts. The latter polyethers generally have a particularly low level of terminal unsaturation of less than 0.07 meq/g, contain a significantly lower proportion of monols and generally have a low polydispersity of less than 1.5. Preferred polyethers are those prepared by double metal cyanide catalysis, more preferably those which have a polydispersity of 1.0 to 1.5, most preferably 1.0 to 1.3. The polydispersity can be determined in known manner using gel permeation chromatography (GPC) to determine not only the number average molecular weight ($M_n$) but also the weight average molecular weight ($M_w$). The polydispersity, PD, is given by $M_w/M_n$.

Examples of preferred polyethers are the Acclaim® 4200, Acclaim® 6300, Acclaim® 8200, Acclaim® 12200 and Acclaim® 18200 products (or the corresponding Acclaim® xx00N grades) from Bayer MaterialScience AG, Leverkusen, Del. These polyoxyalkylene polyols can be used in pure form or as a mixture of different polyethers. It is possible, although less preferred, to admix polyols having lower molecular weights.

The polyethers preferably have average OH functionalities of 1.8 to 4. In polyether mixtures it is possible to use polyethers having OH functionalities of 1 to 6.

It is also possible to use OH-functional prepolymers obtained by reacting polyoxyalkylene polyols having number average molecular weights of 1000 g/mol to 15,000 g/mol with diisocyanates to form OH-functional prepolymers having a molecular weight of preferably 3000 g/mol to 20,000 g/mol, more preferably 8000 to 18,000 g/mol, as described, for example, in U.S. Pat. No. 4,345,053 or EP-A 931 800. The use of such OH functional prepolymers is not preferred.

Suitable compounds containing isocyanate and alkoxysilane groups B) include alkoxysilane-functional monoisocyanates having a molecular weight of 140 g/mol to 500 g/mol. Examples include isocyanatomethyltrimethoxysilane, isocyanatomethyl-triethoxysilane, (isocyanatomethyl)methyldimethoxysilane, (isocyanatomethyl)methyl-diethoxysilane, 3-isocyanatopropyltrimethoxysilane, 3-isocyanatopropylmethyl-dimethoxysilane, 3-isocyanatopropyltriethoxysilane and 3-isocyanatopropylmethyl-diethoxysilane. 3-isocyanatopropyltrimethoxysilane is preferred.

It is also possible to use isocyanate-functional silanes prepared by reacting a diisocyanate with an aminosilane or thiosilane, e.g. as described in U.S. Pat. No. 4,146,585 or EP-A 1136495. However, the use of these compounds is not preferred.

In general the process of the invention is carried out in two stages. In case an allophanatization is used as a second step, it is also possible to carry out that allophanatization step together with the urethanization of components A) and B) in the first step.

The urethanization of components A) and B) can optionally be carried out with a catalyst. Suitable catalysts for curing include organotin compounds and amine catalysts. Examples of organotin compounds include dibutyltin diacetate, dibutyltin dilaurate, dibutyltin bisacetoacetonate and tin carboxylates such as tin octoate. These tin catalysts can be used optionally in combination with amine catalysts such as aminosilanes or 1,4-diazabicyclo[2.2.2]octane. Preferably, dibutyltin dilaurate is used as urethanization catalyst.

In the process of the invention, the catalyst component, where used, is employed in amounts of 0.001 to 5.0% by weight, preferably 0.001% to 0.1% by weight and more preferably 0.005% to 0.05% by weight, based on the solids content of the product.

The urethanization of components A) and B) is carried out at temperatures of 20 to 200° C., preferably 40 to 120° C. and more preferably of 60 to 100° C.

The reaction is continued until complete conversion of the OH groups of the compounds of component A) is achieved. The progress of the reaction can be monitored by means of suitable instruments installed in the reaction vessel and/or by means of analyses on samples taken. Appropriate methods are known. Examples include viscosity measurements, measurements of NCO content, measurements of refractive index, measurements of OH content, gas chromatography (GC), nuclear magnetic resonance (NMR) spectroscopy, infrared (IR) spectroscopy and near-infrared (NIR) spectroscopy. Preferably, IR monitoring is used for existing free NCO groups (for aliphatic NCO groups, band at about $v=2272$ $cm^{-1}$) and GC analysis is used for unreacted NCO groups.

To remove the NCO groups present in the reaction product of components A) and B), there are two possible methods by the process of the invention. The first option is to add another NCO-reactive component C), which in a subsequent reaction step is reacted with the remaining NCO groups. Suitable compounds for this purpose are low molecular weight compounds having a number average molecular weight of up to 400 g/mol and containing one or more alcohol, amine or thiol groups. These compounds may contain other reactive groups. Thiol compounds are less preferred, due to their odor, which is frequently unpleasant.

Examples of monofunctional alcohols include methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethyl-cyclohexane, 3-ethyl-3-hydroxymethyloxetane or tetrahydrofurfuryl alcohol; diethylene glycol monoalkyl ethers such as diethylene glycol monobutyl ether; unsaturated alcohols such as allyl alcohol, 1,1-dimethylallyl alcohol or oleyl alcohol; aromatic alcohols (phenols) such as phenol, the isomeric cresols or methoxyphenols; and araliphatic alcohols such as benzyl alcohol, anisyl alcohol or cinnamyl alcohol.

Examples of polyfunctional alcohols include ethylene glycol, triethylene glycol, tetraethylene glycol, propane-1,2 and -1,3-diol, butane-1,4 and -1,3-diol, hexane-1,6-diol, octane-1,8-diol, neopentyl glycol, 1,4-bis(hydroxymethyl)cyclohexane, bis(hydroxymethyl)tricyclo[$5.2.1.0^{2,6}$]decane or 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, 1,4-phenoldimethanol, bisphenol A, tetrabromobisphenol A, glycerol, trimethylolpropane, hexane-1,2,6-triol-butane-1,2,4-triol, pentaerythritol, quinitol, mannitol, sorbitol, methylglycoside and 4,3,6-dianhydrohexitols.

Amines which can be employed include not only primary but also secondary amines, such as ethylamine, propylamine, isopropylamine, n-butylamine, sec-butylamine, tert-butylamine, hexylamine, 2-ethylhexylamine, cyclohexylamine, benzylamine, dimethylamine, diethylamine, dipropylamine, diisopropylamine, dibutylamine, bis-(2-ethylhexyl)amine, N-methyl- and N-ethylcyclohexylamine or dicyclohexylamine and also heterocyclic secondary amines such as morpholine, pyrrolidine, piperidine or 1H-pyrazole. Also suitable are aromatic amines, such as aniline, diphenylamine or appropriately substituted derivatives.

It is also possible to use compounds having two or more amino groups such as 1,3-diaminopropane, 1,4-diaminobutane, 1,6-diaminohexane, 1,4-diaminocyclohexane or isophoronediamine.

Also suitable are compounds which contain alcohol and amino groups such as ethanolamine, 3-aminopropanol, 2-amino-2-methylpropanol, 2-butylaminoethanol and diethanolamine.

In addition to the preceding compounds it is also possible to use compounds containing isocyanate-reactive groups and silane groups. Examples include aminopropyltrimethoxysilane, mercaptopropyltrimethoxysilane, aminopropylmethyldimethoxysilane, mercaptopropylmethyl-dimethoxysilane, aminopropyltriethoxysilane, mercaptopropyltriethoxysilane, aminopropyl-methyldiethoxysilane, mercaptopropylmethyldiethoxysilane, aminomethyltrimethoxysilane, aminomethyltriethoxysilane, (aminomethyl)methyldimethoxysilane, (aminomethyl)methyl-diethoxysilane, N-butylaminopropyltrimethoxysilane, N-ethylaminopropyltrimethoxysilane, N-phenylaminopropyltrimethoxysilane, N-(3-triethoxysilylpropyl)aspartic acid diethylester, N-(3-trimethoxysilylpropyl)aspartic acid diethylester and N-(3-dimethoxymethylsilylpropyl)-aspartic acid diethylester.

It is necessary to add an amount of component C) that is at least equivalent to the remaining NCO content. It is preferred to have 1 to 1.5 equivalents of C) per equivalent of the NCO groups remaining after the urethanization of A) and B).

It is possible to add additional catalysts for the reaction of the excess isocyanate content with component C), but this is generally unnecessary since the mixture from the preceding urethanization still contains catalysts.

The removal of the excess isocyanate content with component C) is carried out at temperatures of 20 to 200° C., preferably 40 to 120° C. and more preferably of 60 to 100° C. When component C) has a low volatility a correspondingly low temperature is selected.

The reaction is continued until complete removal of the NCO groups (free NCO group content <0.5% by weight, preferably <0.1% by weight, and more preferably <0.05% by weight) has been achieved. This can be checked analytically by the methods previously described.

The second option for removing the NCO groups present in the reaction product of components A) and B) is an allophanatization reaction. In this case no further component C) is added and the remaining NCO groups are reacted with the urethane groups formed from components A) and B).

In order to carry out the allophanatization at moderate temperatures and relatively quickly, it is preferred to use a catalyst which promotes the formation of allophanate groups. Suitable allophanatization catalysts are known and include zinc salts, such as zinc octoate, zinc acetylacetonate and zinc 2-ethylcaproate; or tetraalkylammonium compounds, such as N,N,N-trimethyl-N-2-hydroxy propylammonium hydroxide, N,N,N-trimethyl-N-2-hydroxy propylammonium 2-ethylhexanoate or choline 2-ethylhexanoate. Preferred are zinc octoate (zinc 2-ethylhexanoate) and the tetraalkylammonium compounds, more preferably zinc octoate.

The catalyst is used in amounts of 0.001% to 5.0% by weight, preferably 0.01% to 1.0% by weight and more preferably 0.05% to 0.5% by weight, based on the solids content of the product of the process.

The allophanatizing catalyst can be added in one portion, in several portions or continuously. It is preferred to add the whole amount in one portion.

The allophanatization reaction is carried out at temperatures of 20 to 200° C., preferably 40 to 160° C., more preferably 60 to 140° C., and most preferably 80 to 120° C.

The process of the invention may be carried out continuously in a static mixer, extruder or compounder, for example, or batchwise in a stirred reactor, for example. The process of the invention is preferably carried out in a stirred reactor. The progress of the reaction can be monitored as described above by means of suitable instruments installed in the reaction vessel and/or by means of analyses on samples taken.

The allophanatization reaction is preferably continued until the NCO content of the product is below 0.05% by weight, more preferably below 0.03% by weight.

Besides the two-stage process in which the urethanization is initially carried out using a specific catalyst, and subsequently in a second reaction step the allophanatization is carried out with a second catalyst, it is also possible, in accordance with the process of the invention, to carry out the reaction in one step. In that case it is necessary to use a catalyst which sufficiently rapid catalyzes both the urethanization and the allophanatization reaction. A preferred catalyst for this purpose is zinc 2-ethylhexanoate.

The compounds of the invention are especially suitable for use as binders for producing isocyanate-free elastic polyurethane adhesives and sealants, preferably for automotive engineering and the construction sector. These products crosslink on exposure to atmospheric moisture via silanol polycondensation. Additionally, they are suitable for producing primers and coatings.

To prepare such sealants or adhesives it is possible to formulate the polyurethane prepolymers of the invention, which have alkoxysilane end groups, together with known additives such as plasticizers, fillers, pigments, dryers, additives, light stabilizers, antioxidants, thixotropic agents, catalysts and adhesion promoters by known methods of production.

Suitable basic fillers include precipitated or ground chalks, metal oxides, metal sulphates, metal silicates, metal hydroxides, metal carbonates and metal hydrogen carbonates. Examples of other fillers include reinforcing and nonreinforcing fillers such as carbon black, precipitated silicas, pyrogenic silicas, ground quartz or diverse fibers. Both the basic fillers and also the further reinforcing or nonreinforcing fillers may optionally have undergone surface modification. Particularly preferred basic fillers are precipitated or ground chalks and also pyrogenic silicas. Mixtures of fillers can also be used.

Suitable plasticizers include phthalic esters, adipic esters, alkylsulphonic esters of phenol, or phosphoric esters. Additionally, long-chain hydrocarbons, polyethers and vegetable oils can be used as plasticizers. Suitable thixotropic agents include pyrogenic silicas, polyamides, hydrogenated castor oil derivatives or polyvinyl chloride.

Suitable curing catalysts include any organometallic compounds and amine catalysts known to promote silane polycondensation. Particularly suitable organometallic compounds include compounds of tin and of titanium. Examples of preferred tin compounds include dibutyltin diacetate, dibutyltin dilaurate, dioctyltin maleate and tin carboxylates such as tin(II) octoate or dibutyltin bisacetoacetonate. The tin catalysts may optionally be used in combination with amine catalysts such as amino silanes or 1,4-diazabicyclo[2.2.2]octanes. Preferred titanium compounds include alkyl titanates, such as diisobutyl bis(ethyl acetoacetate)titanate. When amine catalysts are used alone, preferred catalysts are those which have an especially high base strength, such as amines with an amidine structure. Preferred amine catalysts include 1,8-diazabicyclo[5.4.0]undec-7-ene or 1,5-diazabicyclo[4.3.0]non-5-ene.

Suitable driers include alkoxysilyl compounds such as vinyltrimethoxysilane, methyltrimethoxysilane, i-butyltrimethoxysilane, and hexadecyltrimethoxysilane. Adhesion promoters include the known functional silanes such as the previously mentioned aminosilanes and also N-aminoethyl-3-aminopropyltrimethoxy and/or N-aminoethyl-3-aminopropylmethyldimethoxysilane, epoxysilanes and/or mercaptosilanes.

The crosslinked polymers have very good tensile strength and high modulus at low elongations. In addition the tackiness (tack) is very much lower than in the case of the non-inventive, comparative examples. For a given molecular weight, as the NCO/OH ratio drops, a decrease in modulus and in Shore hardness and an increase in breaking elongation are observed in the polymer.

The invention is further illustrated but is not intended to be limited by the following examples in which all parts and percentages are by weight unless otherwise specified.

EXAMPLES

The determination of the NCO contents in % was performed by back-titration with 0.1 mol/l hydrochloric acid following reaction with butylamine in accordance with DIN EN ISO 11909.

The viscosity measurements were conducted at 23° C. using a plate/plate rotational viscometer, RotoVisko 1 from Haake, Del., in accordance with ISO/DIS 3219:1990.

The ambient temperature of 23° C. prevailing at the time when the experiments were conducted is designated RT.

Example 1

Inventive, Excess Consumed by Urethanization Reaction 1009.8 g of a polypropylene glycol having an OH number of 6.1 (Acclaim® 18200N, Bayer MaterialScience AG, Leverkusen) were dried at 120° C. under reduced pressure (low nitrogen transit rate) for six hours. Then at 60° C. initially 28.88 g of 3-isocyanatopropyltrimethoxysilane (A-link 35®, GE Advanced Materials, Wilton, Conn., USA) (index 1.20) and then 100 ppm of dibutyltin dilaurate (Desmorapid Z®, Bayer MaterialScience AG, Leverkusen, Del.) were added rapidly and the reaction was continued at 60° C. over five hours until a residual NCO content of 0.09% was reached. The reaction was cooled to 50° C. and 1.67 g of butanediol were mixed in. Stirring was continued at 50° C. for about 90 minutes until an NCO content was no longer detected. The resulting polyurethane prepolymer contained alkoxysilyl end groups and had a viscosity of 35,000 mPa·s (23° C.).

Example 2

Inventive, Excess Consumed by Allophanatization Reaction 1009.8 g of a polypropylene glycol having an OH number of 6.1 (Acclaim® 18200N, Bayer MaterialScience AG, Leverkusen) were dried at 120° C. under reduced pressure (low nitrogen transit rate) for six hours. Then at 60° C. initially 26.46 g of 3-isocyanatopropyltrimethoxysilane (NCO=19.2%, A-link 35®, GE Advanced Materials, Wilton, Conn., USA) (index 1.10) and then 100 ppm of dibutyltin dilaurate (Desmorapid Z®, Bayer MaterialScience AG, Leverkusen, Del.) were added rapidly and the reaction was continued at 60° C. over five hours until a residual NCO content of 0.04% was reached. Then 1.0 g of zinc octoate (zinc 2-ethylhexanoate, Octa-Soligen Zinc 22, Borchers, Monheim, Del.) was added and stirring was continued at 100° C. for about six hours until an NCO content was no longer detected. The resulting polyurethane prepolymer contained alkoxysilyl end groups and had a viscosity of 49,700 mPa·s (23° C.).

Comparative Example 918 g of a polypropylene glycol having an OH number of 6.1 (Acclaim® 18200N, Bayer MaterialScience AG, Leverkusen) were dried at 120° C. under reduced pressure (low nitrogen transit rate) for six hours. Then at 60° C. initially 21.88 g of 3-isocyanatopropyltrimethoxysilane (A-link 35®, GE Advanced Materials, Wilton, Conn., USA) (index 1.0) and then 100 ppm of dibutyltin dilaurate (Desmorapid Z®, Bayer MaterialScience AG, Leverkusen, Del.) were added rapidly and the reaction was continued at 60° C. over five hours until an NCO content was no longer detected. The resulting polyurethane prepolymer contained alkoxysilyl end groups and had a viscosity of 34,000 mPa·s (23° C.).

Formulation of a Joint-Sealing Compound

In a commercially available vacuum planetary dissolver, the following components were processed to a ready-to-use sealant:

Stage 1

24.3 parts by weight of the alkoxysilane-functional prepolymers from Examples 1 and 2 and comparative Example 1

36.3 parts by weight of plasticizer (Jayflex DIDP from ExxonMobil Chemical)

36.5 parts by weight of precipitated chalk (Socal® U1S2 from Solvay GmbH)

1.1 parts by weight of Cab-o-Sil TS 720 (pyrogenic silica from Cabot GmbH)

1.1 parts by weight of vinyltrimethoxysilane 0.2 parts by weight of dibutyltin-bisacetoacetonate (10% strength solution in Jayflex DIDP)

Stage 1 of the mixture was dispersed under a pressure of 200 mbar for a total of 15 minutes, including 10 minutes at n=3000 min$^{-1}$ and a further 5 minutes at n=1000 min$^{-1}$, with cooling and with a static vacuum. This was followed by the incorporation of Stage 2

0.5 part by weight of N-aminoethyl-3-aminopropylmethyldimethoxysilane for 10 minutes at n=1000 min$^{-1}$ with cooling. This operation was carried out for 5 minutes under static vacuum and for a further 5 minutes under dynamic vacuum.

The product was filled into a polyethylene cartridge and stored at room temperature.

After storage for one day the sealant composition cured with a skin-forming time of 10 to 20 minutes.

The following mechanical properties were determined after curing for fourteen days at 24° C. and 50% relative humidity:

|  | Comparative example | Example 1 | Example 2 |
|---|---|---|---|
| Tensile strength (DIN 53504), [N/mm$^2$] | 1.6 | 2.1 | 1.8 |

-continued

|  | Comparative example | Example 1 | Example 2 |
|---|---|---|---|
| 100% modulus (DIN 52455/1), [N/mm$^2$] | 0.4 | 0.7 | 0.7 |
| Shore A hardness (DIN 53505) | 17 | 24 | 25 |
| Tack 1/3/7/14 d* | 3/2/1/1 | 2/1/1/1 | 2/1/1/1 |

*Scale from 1–5; 1 = tack-free, 3 = slight surface tack, pieces of dirt were stuck, 5 = highly tacky material, virtually inseparable from the material to which it was applied.

Summary:

The mechanical properties of the formulated binders, compared to the comparative example, showed significantly increased values for the Shore A hardness, the tensile strength and the 100% modulus and also a reduced (subjective) tack of the polymer surfaces. The improvements are a result of the significantly improved crosslinking of the long polymer chains, which is achieved with the compounds according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing an alkoxysilane-functional prepolymer comprising reacting
   A) 1.0 equivalent of a polyol component having a number average molecular weight of 3000 g/mol to 20,000 g/mol and comprising one or more polyoxyalkylene polyols or polyoxyalkylene polyol prepolymers with
   B) 1.05 to 1.50 equivalents of an isocyanate- and alkoxysilane-functional compound of the formula I),

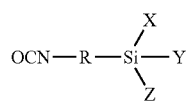

(I)

wherein
X, Y, and Z independently of one another are linear or branched $C_1$-$C_8$ alkyl or $C_1$-$C_8$ alkoxy radicals, wherein at least one of the radicals is a $C_1$-$C_8$ alkoxy group and
R is an organic radical having a functionality of at least two,
and subsequently further reacting the remaining free NCO groups by allophanatization
such that after the further reacting of the remaining free NCO groups, the amount of NCO groups remaining is less than 0.05% by weight, based on the weight of the reaction mixture.

2. The process of claim 1 wherein X, Y and Z independently of one another are a methoxy or ethoxy group and R is a methylene or propylene radical.

3. The process of claim 1 wherein said polyoxyalkylene polyol has a number average molecular weight of 8000 g/mol to 18,000 g/mol.

4. The process of claim 3, wherein said polyoxyalkylene polyol has a terminal unsaturation content of less than 0.07 meq/g and a polydispersity of less than 1.5.

5. The process of claim 1 wherein the compound of formula I) has a molecular weight of 140 g/mol to 500 g/mol.

6. The process of claim 1 which comprises carrying out the allophanatization reaction in the presence of a catalyst.

7. An alkoxysilane-functional prepolymer which is obtained by a process comprising reacting
   A) 1.0 equivalent of a polyol component having a number average molecular weight of 3000 g/mol to 20,000 g/mol and comprising one or more polyoxyalkylene polyols or polyoxyalkylene polyol prepolymers with
   B) 1.05 to 1.50 equivalents of an isocyanate- and alkoxysilane-functional compound of the formula I),

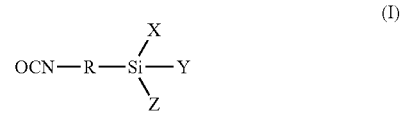

(I)

wherein
X, Y, and Z independently of one another are linear or branched $C_1$-$C_8$ alkyl or $C_1$-$C_8$ alkoxy radicals, wherein at least one of the radicals is a $C_1$-$C_8$ alkoxy group and
R is an organic radical having a functionality of at least two,
and subsequently further reacting the remaining free NCO groups by allophanatization
such that after the further reacting of the remaining free NCO groups, the amount of NCO groups remaining is less than 0.05% by weight, based on the weight of the reaction mixture.

8. The alkoxysilane-functional prepolymer of claim 7 wherein X, Y and Z independently of one another are a methoxy or ethoxy group and R is a methylene or propylene radical.

9. The alkoxysilane-functional prepolymer of claim 8 wherein said polyoxyalkylene polyol has a number average molecular weight of 8000 g/mol to 18,000 g/mol, a terminal unsaturation content of less than 0.07 meq/g and a polydispersity of less than 1.5.

10. The alkoxysilane-functional prepolymer of claim 9 wherein the compound of formula I) has a molecular weight of 140 g/mol to 500 g/mol.

11. The alkoxysilane-functional prepolymer of claim 8 wherein the compound of formula I) has a molecular weight of 140 g/mol to 500 g/mol.

12. The alkoxysilane-functional prepolymer of claim 7 wherein said polyoxyalkylene polyol has a number average molecular weight of 8000 g/mol to 18,000 g/mol, a terminal unsaturation content of less than 0.07 meq/g and a polydispersity of less than 1.5.

13. The alkoxysilane-functional prepolymer of claim 12 wherein the compound of formula I) has a molecular weight of 140 g/mol to 500 g/mol.

14. The alkoxysilane-functional prepolymer of claim 7 wherein the compound of formula I) has a molecular weight of 140 g/mol to 500 g/mol.

15. A coating, primer, adhesive or sealant prepared from the alkoxysilane-functional polyurethane of claim 7.

* * * * *